United States Patent
Bucuresteanu

(10) Patent No.: US 12,161,120 B2
(45) Date of Patent: Dec. 10, 2024

(54) INORGANIC PIGMENT WITH THE FUNCTION OF LIGHT ACTIVATED CATALYST

(71) Applicant: SPECTRUM BLUE AS, Sandnes (NO)

(72) Inventor: Razvan-Catalin Bucuresteanu, Bucharest (RO)

(73) Assignee: SPECTRUM BLUE AS, Sandnes (NO)

( * ) Notice: Subject to any disclaimer, the term of this patent is extended or adjusted under 35 U.S.C. 154(b) by 0 days.

(21) Appl. No.: 18/553,794

(22) PCT Filed: Apr. 13, 2022

(86) PCT No.: PCT/RO2022/050005
§ 371 (c)(1),
(2) Date: Oct. 3, 2023

(87) PCT Pub. No.: WO2022/220702
PCT Pub. Date: Oct. 20, 2022

(65) Prior Publication Data
US 2024/0081335 A1    Mar. 14, 2024

(30) Foreign Application Priority Data
Apr. 15, 2021 (RO) .............................. a 2021 00176

(51) Int. Cl.
| | |
|---|---|
| *A01N 59/16* | (2006.01) |
| *A01N 59/20* | (2006.01) |
| *B01J 21/06* | (2006.01) |
| *B01J 35/39* | (2024.01) |
| *C09C 1/36* | (2006.01) |
| *C09D 7/62* | (2018.01) |

(52) U.S. Cl.
CPC .............. *A01N 59/16* (2013.01); *A01N 59/20* (2013.01); *B01J 21/063* (2013.01); *B01J 35/39* (2024.01); *C09C 1/3661* (2013.01); *C09D 7/62* (2018.01); *C01P 2002/34* (2013.01); *C01P 2004/86* (2013.01)

(58) Field of Classification Search
CPC ........... C09D 7/62; B01J 35/39; B01J 21/063; C09C 1/3661
See application file for complete search history.

(56) References Cited

U.S. PATENT DOCUMENTS

2003/0148881 A1* 8/2003 Matsuo .................... B01J 23/14
                                                         502/300

OTHER PUBLICATIONS

A. Anzai, et al., Highly Selective Photocatalytic Reduction of Carbon Dioxide with Water Over Silver-Loaded Calcium Titanate, Catalysis Communications, Sep. 2017, vol. 100, 13 pages, Elsevier, Amsterdam, The Netherlands.

* cited by examiner

*Primary Examiner* — Yong L Chu
(74) *Attorney, Agent, or Firm* — Polsinelli PC

(57) ABSTRACT

The present invention relates to an inorganic pigment with the function of a catalyst that can be activated by light from the entire visible spectrum but also in the absence of light, to a process for obtaining it, to various formulations containing this inorganic pigment and its use. The present invention also provides a method of destroying pathogens represented by irradiating with electromagnetic radiation from the entire visible spectrum (400 nm-700 nm) the surfaces on which they have been applied—formulations containing the inorganic pigment. Additionally, the invention provides the use of the pigment disclosed herein for its catalytic, bactericidal, virucidal and de-pollution activity in the absence of light.

16 Claims, 12 Drawing Sheets

INORGANIC PIGMENT WITH THE FUNCTION OF LIGHT ACTIVATED CATALYST

This application is a 35 U.S.C. § 371 National Stage of International Application No. PCT/RO2022/050005, filed Apr. 13, 2022, which claims the benefit of RO App. No. a 2021 00176, filed Apr. 15, 2021, the entire contents of which are incorporated herein by reference.

The present invention relates to an inorganic pigment with the function of catalyst that can be activated by light from the entire visible spectrum but also in the absence of light, to a process for obtaining it, to various formulations containing this inorganic pigment and to its use. The present invention also provides a method of destroying pathogens comprising irradiating with electromagnetic radiation from the entire visible spectrum (400 nm-700 nm) the surfaces on which they were applied—formulations containing the inorganic pigment. Additionally, the invention provides the use of the pigment disclosed herein for its catalytic, bactericidal and virucidal activity in the absence of light.

STATE OF THE ART

It has long been known that semiconductor metal oxide photocatalysts act as photosensitizers (FS) in photochemical reactions. The main problem with the use of these photocatalysts is that they can only be activated by electromagnetic radiation in the UV-A range, radiation that is dangerous to humans. Therefore, these semiconductor metal oxide photocatalysts cannot be used in photocatalytic applications in the presence of man.

There are known laboratory or industrial techniques by which photocatalysts of doped semiconductor metal oxide are obtained and which are activated by electromagnetic radiation in the visible field. By these processes, inorganic or organo-metallic doped photocatalysts are obtained which are in the form of nanoparticles, as defined in the standard ISO/TS80004-2: 2015 *Nanotechnologies—Vocabulary—Part 2: Nano-objects* having dimensions in the length range of approx. from 1 nm to 100 nm. Nanomaterials are not industrially accepted as functional pigments because the absence of the possibility to detect nanomaterials released into the environment, imposed by the legislation in force restrictions on technological use, environment and occupational safety. The World Health Organization (WHO) has been recommending from 2017 to reduce exposure and protect workers from the potential risk of manufactured nanomaterials.

All known processes for obtaining photocatalysts doped in visible light have a very low overall reaction yield relative to the useful product (mass of useful product/mass of reaction products) of about 5-10%, being economically unfeasible. These known processes generate large amounts of chemical waste, and their neutralization requires special facilities that generate extremely high neutralization costs.

U.S. Pat. No. 7,449,245B2 patent describes a method of producing a photocatalytic substrate based on $TiO_2$ which is prepared from an organic solvent or mixtures of inorganic solvents, in which a hydrolysable titanium compound of the form $TiX_4$ is dissolved where the hydrolysable X groups may be alkoxides, aryloxides, acyloxides or alkylcarbonyl. To this solution is added oxide or a complex metal salt of the carboxylate type, for example, acetate or acetylacetonate. The major disadvantage of this method is that the reaction yield is very low by about 5-10% in the useful product and generates many secondary compounds, chemical waste difficult to inactivate.

Patent application WO9805601 describes a hydraulic binder, a cement composition, a dry mix of architectural concrete containing photocatalyzed particles that are capable of oxidizing pollutants in the presence of light air humidity and the environment where the preferred photocatalyst is titanium dioxide. The major disadvantage of this technique is given by the fact that for the activation of the photosensitizer it is necessary to irradiate it with light from the UV-A domain, which is, in small quantities, in the light radiation.

EP0633064B1 patent discloses a photocatalytic composite comprising a substrate having photocatalytic particles such as titanium oxide adhering thereto through a less degrading adhesive and a process for producing the composite. The least degrading adhesive is a silicon or cement compound. The major disadvantage of this technique is that in order to activate the photosensitizer it is necessary to irradiate with light from the UV-A range, which is, in small amounts, in the light radiation.

Therefore, there is a need for efficient economic and ecological methods and technologies for the manufacture of photocatalysts that are activated by visible spectrum radiation, that comply with international certification standards and pollution standards, that may be obtained with higher efficiency, without generating toxic waste difficult to neutralize and with relatively low production costs.

The Invention's Purpose

The objective of the present invention is to provide an inorganic pigment with the function of activated catalyst both in the presence of light from the whole visible spectrum (role of photocatalyst) but also in the absence of light (role of catalyst).

Another objective of the present invention is to provide a process for obtaining the inorganic pigment with the function of a catalyst which can be activated by light from the whole visible spectrum) but also in the absence of light.

Another objective is to provide various formulations comprising as active ingredient the inorganic pigment with the function of catalyst which can be activated by light from the whole visible spectrum but also in the absence of light selected from any formulations suitable for covering surfaces with a decorative or protective role.

Yet another purpose is to provide building materials that include as active ingredient the inorganic pigment with the function of catalyst that can be activated by light from the entire visible spectrum but also in the absence of light, building materials selected from plasters, concrete, mortars, cement, plasticized or unplasticized paper or paperboard, polymeric and bituminous protective membranes, self-cleaning coatings, asphalt or asphalt or bituminous mixtures, self-cleaning building slabs or fillers, powders addition to which it gives catalytic properties.

Another objective of the invention is to provide cosmetics which contain as active ingredient the inorganic pigment with the function of catalyst which can be activated by light from the entire visible spectrum but also in the absence of light, cosmetics selected from the class of dermatological products with antibacterial effect by application to the skin.

A final objective of the present invention is to provide a method for the destruction of pathogens which comprises the application of various formulations containing as active ingredient the pigment as a catalyst which can be activated by light from the whole visible spectrum (light-activated inorganic agents—LAIAs) on the surface to be sanitized.

BRIEF DESCRIPTION OF THE INVENTION

The present invention eliminates the above-mentioned disadvantages in the prior mentioned technique status as well as other disadvantages revealed in the prior mentioned technique status.

A first objective of the present invention relates to an inorganic pigment with the function of catalyst which can be activated by light in the whole visible spectrum but also in the absence of light, which comprises a first layer composed of a semiconductor metal oxide, the second layer which consists of ferroelectric perovskite or pseudo-perovskite inorganic structures of type $ABO_3$ or $A_2B_2O_6$ and a third layer consisting of metal nanometric clusters.

Another objective of the present invention relates to a process for obtaining the inorganic pigment with the function of a catalyst which can be activated by light from the entire visible spectrum but also in the absence of light.

Another objective of the invention relates to various formulations which contain as active ingredient this pigment with the function of catalyst which can be activated by light from the entire visible spectrum but also in the absence of light selected from any formulations suitable for covering rolled decorative or protective surfaces.

A further objective of the invention relates to construction materials comprising as active ingredient inorganic pigment with the function of catalyst that can be activated by light from the entire visible spectrum but also in the absence of light selected from plasters, concrete, mortars, cement, plasticized or unplasticized paper or cardboard, polymeric and bituminous protective membranes, self-cleaning coatings, asphalt or asphalt or bituminous mixtures, self-cleaning slabs or fillers, powders which add catalytic properties.

For another objective, the invention relates to cosmetic products which comprise as active ingredient the inorganic pigment with the function of catalyst which can be activated by light from the entire visible spectrum but also in the absence of light selected from the class of dermatological products with antibacterial effect by application on the skin.

Another objective of the invention provides industrial catalysts used in chemical synthesis in the form of mass catalysts made only of inorganic pigment with the function of a catalyst that can be activated by light from the entire visible spectrum but also in the absence of light.

Another objective of the invention is to provide industrial catalysts used in chemical synthesis, catalysts which are in the form of supported catalysts made of an inert pre-existing solid which forms the support on which an inorganic pigment with the function of catalyst it can also be activated by light from the entire visible spectrum but also in the absence of light.

Another objective of the invention is to provide electrodes for the electrochemical photo-dissociation of water or ionic substances, electrodes made on the basis of inorganic pigment with the function of catalyst that can be activated by light from the entire visible spectrum but also in the absence of light.

Another objective of the invention is to provide industrial catalysts used in chemical synthesis, catalysts which are in the form of supported catalysts made of an inert pre-existing solid forming the support which is impregnated with the active-catalytic component which is formed of inorganic pigment with the function of a catalyst that can be activated by light from the entire visible spectrum but also in the absence of light Finally, another objective of the invention is to provide a method of destroying pathogens comprising the application of various formulations containing as active ingredient this pigment with the function of catalyst that can be activated by light from the entire visible spectrum (light-activated inorganic agents—LAIAs) but also in the absence of light on the surface to be sanitized.

Definition of Terms and Description of Figures

The term inorganic pigment with the function of catalyst that can be activated by the light from the visible spectrum (light-activated inorganic agents—LAIAs) defines a compound that is included in the class of "functional pigments" (ISO 18451-1: 2019—pigments, dye and diluents) which, when applied in the application medium, have specific functions due to their unique physical or chemical properties in addition to their coloring properties.

The term "nanomaterials" refers to the size located in the nanoscale—1 nm up to at 100 nm.

The term "bulk materials" refers to micronized materials with dimensions greater than 100 nm, generally greater than 500 nm.

The term metal nanometric Clusters (of Cu, Ag or Au) deposited on the structure of the second layer refers to the layer formed on the surface of the second layer with a thickness of 1 (one) to 5 (five) atoms of Cu, Ag or Au, but not more than 1 nm thick, and having a variable length from 1 nm to 50 nm.

For industrial technical references in the scope of "nanotechnologies" and "Nanomaterials", the International Organization for Standardization ISO has introduced the technical reference standard ISO/TS 80004-2: 2015 Nanotechnologies—Vocabulary—Part 2: Nano-objects. This document lists the terms and definitions related to the technical specifications of nanotechnology particles, particles that have dimensions in the "nanoscale" from 1 nm to 100 nm. Nanostructured materials have particle sizes below 100 nm and possess properties.

Therefore, for all economic agents, but also for all users, provisions have been formulated that apply to the use of powdered chemicals, depending on their size, especially in the case of "nanomaterials". The "Recommendation of the Commission of 18 Oct. 2011 on the definition of nanomaterials in the EEA relevance published in OJ L 275, 20.10.2011, pp. 38-40" recommended the use of the terms "nanomaterial" as a reference in the Union for economic, scientific and economic policy purposes. The definition that facilitates a uniform interpretation in the legislation is based only on the size of the particles that make up a material, it being the most appropriate size to be measured. In order to define as a size range "nanomaterials" as distinct particles of "micronized bulk materials" it was approved by the Commission Recommendation of 18 Oct. 2011 that the lower limit be 1 nm and that an upper limit of 100 nm to be used for which a general consensus was reached. Natural, secondary or manufactured materials are included in this definition, based only on the size of a material.

The industry reference for defining the terms "pigments" is the ISO standard 18451-1: 2019—Pigments, dyes and diluents. Terminology. Part 1: General terms. This standard refers to the linear average dimensions of the particles present in the polymer dispersions and defines the meaning of the specific terms "pigment", "functional pigment", which are of "micronized" dimensions and separates them from the functional terms.

"Nanomaterials" or "nanoparticles". Which are defined as materials with external dimensions in nanoscale, "nanoscale" being a term defined as any dimension that is in the range of 1 nm to 100 nm.

"Mass catalysts"—Simple catalysts made only from a single active phase.

FIGURES PRESENTATION

FIG. 1—shows a longitudinal section in the structure of the inorganic pigment with the function of catalyst. It is observed in 1) the inorganic pigment with the function of activated catalyst also by the light LAIAs is formed by molecular octahedra of $TiO_2$, anatase or rutile, layer that forms the co-activated support of the pigment, in 2) the second layer, also called pseudo-two-dimensional perovskite, consists of ferroelectric inorganic structures represented by molecular octahedra of $TiO_2$ between which calcium cations are intercalated $Ca^{2+}$ or barium $Ba^{2+}$, cations that are coordinated to the oxygen atoms in the peaks of molecular octahedra of $TiO_2$ and 3) the third layer consisting of metallic nanometric clusters selected from Cu, Ag and Au deposited between the two-dimensional pseudo-perovskite layers.

FIG. 2—shows an orthorhombic structure of $ABO_3$ perovskite type, with a formula of $(^{XII}A^{2+}\ ^{VI}B^{4+}\ O^{2-}{}_3)$ type; where "A" cation is an alkali or alkaline earth metal, "B" cation is a transition metal, "A" and "B" are two cations of very different sizes, "A" atoms are larger than "B" atoms, and "O" is an anion that binds to both cations. Within the standard orthorhombic perovskite structure, "B" cation in coordination 6(VI) times, surrounded by an octahedron centered by "A" cation in octahedral coordination 12(XII) times.

FIG. 3—represents Gibbs free energy diagram for bulk rutile polymorphic form of $TiO_2$ (solid line) and for the polymorphic form of $TiO_2$ (dotted line);

FIG. 4—represents the Pouboix diagram for $TiO_2$;

FIG. 5—illustrates the formation at the interface of the $TiO_2$ pigment of an electrical double layer (abbreviated SDE) in the form of an electrochemical interface due to the formation of hydrogen bonds between the anions of the $OH^-$ hydroxyl group; anions that form the first electrical layer and the second layer is given by $Na^+$ cations.

FIG. 6—represents the way in which the calcium cations within the electric double layer from the surface of the $TiO_2$ pigment interface; after losing the —HO group at temperature, they intertwine between the molecular octahedra of $TiO_2$ and make coordinate bonds with the oxygen atoms within the molecular octahedra that make up the pigment interface. This way, an inorganic structure of $CaTiO_3$ perovskite type is composed.

FIG. 7—represents the Pouboix diagram for Cu;

FIG. 8—illustrates SEM images on the surface of the pigment where it is observed at 1) nanometric Cu clusters deposited on the pigment surface;

FIG. 9—shows the result of recording the light absorption according to the reflectance recorded for a sample of LAIAs pigment (light-activated inorganic agents-LAIAs) compared to a sample of anatase $TiO_2$ and one of rutile $TiO_2$, both of industrial origin. A SPECORD 250-222P108 spectrophotometer has been used for the measurements. The new pigment shows photocatalytic activity over the entire visible 400 nm-700 nm spectrum.

DESCRIPTION OF THE INVENTION

The invention shall be described in detail below.

In a first example, the invention relates to an inorganic pigment with the function of a light-activated catalyst which comprises:

a first layer consisting of a semiconducting metal oxide selected from rutile or anatase $TiO_2$, preferably rutile, with high dielectric constant characterized by a εr relative permittivity within the range 60-100, for industrial use with a size within the range 220 nm up to at 4 μm, preferably within the range 220 nm to 40 μm, a second layer, which is called a two-dimensional pseudo-perovskite phase, consisting of perovskite or pseudo-perovskite inorganic ferroelectric structures in the form $ABO_3$ or $A_2B_2O_6$, and a third layer consisting of metal nanometric clusters that are deposited on the structure of the second layer.

Figure 3:
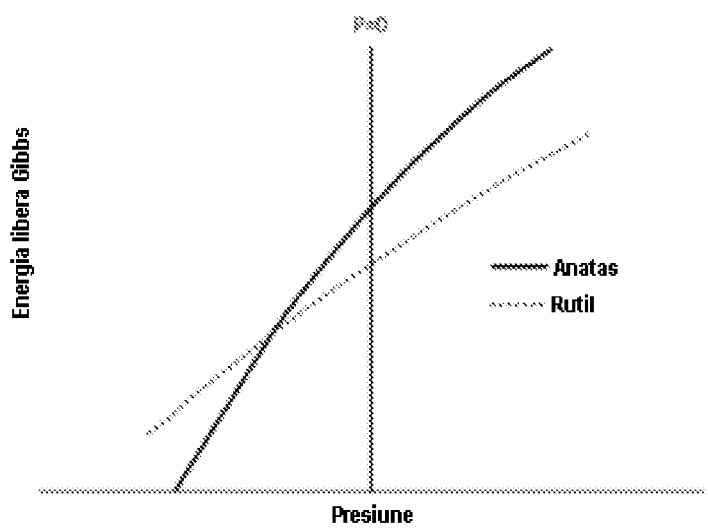

In an even more preferred embodiment, the first layer consists of rutile $TiO_2$ semiconducting metal oxide particles. It is preferred to use bulk particles of rutile $TiO_2$ for industrial use because the photocatalytic performance of the crystal polymorphic form of bulk rutile $TiO_2$ is better than that of the polymorphic form of anatase $TiO_2$. The experimental band gap of the polymorphic form of bulk rutile $TiO_2$ is −3.0 eV which is much smaller than the polymorphic form of anatase $TiO_2$ which has an experimental band gap of ~3.2 eV. In the case of nanoparticles (especially those with sizes between 1 nm and 50 nm) the anatase $TiO_2$ crystal is more photocatalytic than the rutile $TiO_2$ crystal due to surface energy [according to: Hanaor D. A. H., Sorrell C. C. *Review of the anatase to rutile phase transformation*. J Mater Sci 46, 855-874 (2011)77, doi: 10.1007/s10853-010-5113-0]. As seen in the GIBBS free energy diagram, FIG. 3, the polymorphic form of bulk rutile $TiO_2$ is more thermodynamically stable than the polymorphic form of anatase $TiO_2$ at all temperatures and pressures [see: Hanaor D. A. H., Sorrell C. C. *Review of the anatase to rutile phase transformation*. J Mater Sci 46, 855-874 (2011)77, doi: 10.1007/s10853-010-5113-0].

Furthermore, the first layer of inorganic pigment with the function of light-activated inorganic agents (LAIAs) is made of rutile or anatase $TiO_2$, preferably the polymorphic form of rutile, because the other semiconducting metal oxides cannot take part in these reactions. ZnO is amphoteric and in the presence of strong basic solutions—a mandatory step for the formation of active centers—they turn into soluble Zn galvanized, and $SiO_2$, or $WO_3$ or $Al_2O_3$ or other semiconducting metal oxides do not have active oxygen centers on their surface. The reactions described in this invention are specific only to the $TiO_2$ molecule, which has a certain specificity of its own in the formation of molecular orbitals and allows the described reactions to take place.

The first layer represents the co-activated support of the inorganic pigment with the function of light activated catalyst.

In another preferred embodiment of the invention, the second layer, which is called a two-dimensional pseudo-perovskite phase, is formed at the molecular interface of the first layer where alkaline earth metal cations, preferably $Ca^{2+}$ or $Ba^{2+}$, are inserted between the molecular octahedra of $TiO_2$ that compose the surface level of the interface of the first layer. These alkaline earth metal cations together, with the molecular octahedra of $TiO_2$ between which they are inserted, shall form a perovskite or pseudo-perovskite inorganic ferroelectric structure of type $ABO_3$ or $A_2B_2O_6$ where the "O" type anion and the "B" type cation are represented by the oxygen anions and titanium cations of the molecular octahedra of $TiO_2$ from the composition of the surface level of the first layer interface, and the "A" type cation is represented by alkaline earth metal intrusions, preferably $Ca^{2+}$ or Be', which are coordinated to the "O" anions of the molecular octahedra of $TiO_2$ from the composition of the surface level of the first layer interface.

Figure 6:
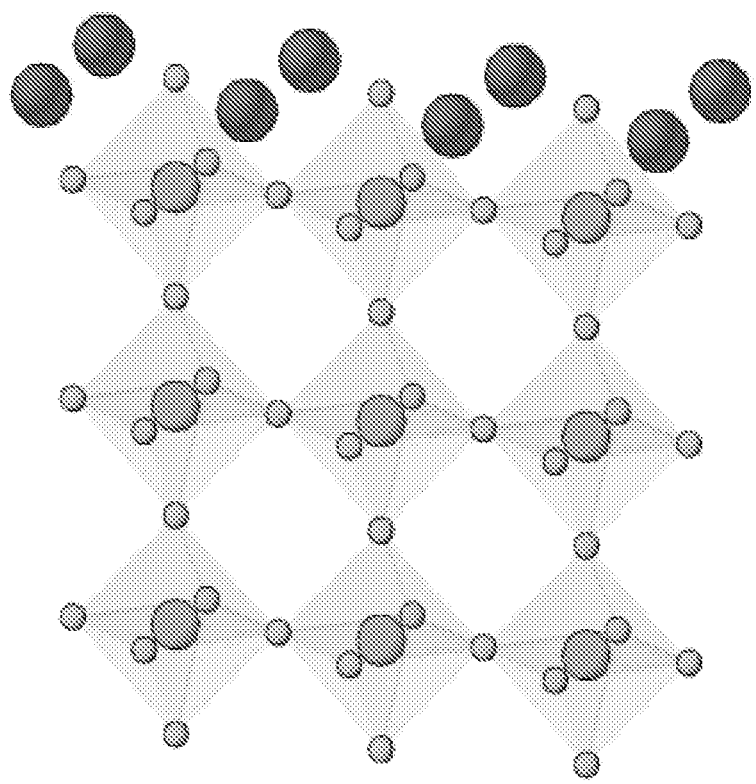

In the rutile or anatase $TiO_2$ structures, whether nanometric or bulk, only $Ca^{2+}$ or $Ba^{2+}$ alkaline earth metals can be inserted between the octahedra of $TiO_2$, because the GOLDSCHMIDT tolerance factor, which is an indicator for the stability and distortion of crystalline structures, is about 1 for $BaTiO_3$ and about 0.9 for $CaTiO_3$. Inherently, $Ca^{2+}$ or $Ba^{2+}$ cations can migrate between $TiO_2$ octahedra, where they will form coordinate bonds with the oxygen anions of these $TiO_2$ octahedra. The intrusion of $Ca^{2+}$ or $Ba^{2+}$ cations, due to the electrostatic repulsion forces, can be made only on 1, maximum 2 layers of $TiO_2$ and shall form with these $TiO_2$ octahedra two-dimensional pseudo-perovskite phase type layers, as seen in FIG. 6, which show that they have a structure close to the perovskite one.

The literature does not describe two-dimensional phases formed at the interfaces of $TiO_2$ crystals where, between the molecular octahedra of $TiO_2$, there are interposed in the same level cations of alkaline earth metals of $Ca^{2+}$ or $Ba^{2+}$. This description represents a new two-dimensional perovskite phase layer model.

It is known from the literature that perovskites can be structured in layers, forming $ABO_3$-type structures separated by thin layers of intrusive material. These structures are defined in the literature as follows:
1. AURIVILLIUS phase—the input layer is composed of a bismuth ion of $[Bi_2O_2]^{2+}$ type that appears in each n ABO layers;
2. DION-JACOBSON phase—the input layer is composed of an alkali metal (M) at each n ABO 3 layers, giving the general formula as $M^+A_{(n-1)} B_nO(3_{n+1})$, M being a different cation of B,
3. RUDDLESDEN-POPPER phase—the simplest of the phases, the input layer takes place between each (n=1) or several (n>1) layers of $ABO_3$.

In another preferred embodiment of the invention, the second layer consists of inorganic ferroelectric structures of the perovskite or pseudo-perovskite type of $ABO_3$ or $A_2B_2O_6$ form, where alkaline earth metal cations are interposed between the surface layer of the molecular octahedra of $TiO_2$, cations that are coordinatively bound to oxygen atoms at the edges of octahedral $TiO_2$ crystals and form a layer of one or two orthorhombic or pseudo-orthorhombic crystals thickness, a layer called a $A_2B_2O_6$ two-dimensional pseudo-perovskite phase, similar to the $ABO_3$ perovskite, where the "O" type anion is given by the oxygen atoms at the interface of the $TiO_2$ nucleus, and the "B" type transition metal cation is represented by the titanium atoms at the first layer interface.

In an even more preferred embodiment, the second layer of the pigment consists of ferroelectric inorganic structures represented by two-dimensional plates of octahedral molecular crystals of $TiO_2$ between which there are interposed $Ca^{2+}$ or $Ba^{2+}$ cations, cations that are coordinatively bound to oxygen atoms of the edges of octahedral $TiO_2$ crystals, which form a layer of one or two molecular octahedra thickness, a layer called a two-dimensional pseudo-perovskite phase, strongly adherent to the surface of the first layer and resembling an $ABO_3$ or $A_2B_2O_6$-shaped perovskite or pseudo-perovskite, where the "O" type anion is given by the oxygen atoms at the interface of the first layer of $TiO_2$, and the type "B" transition metal cation is represented by the titanium atoms at the interface between the first and second layer ($TiO_2$ perovskite or pseudo-perovskite interface). The "A" type cation is represented by Calcium $Ca^{2+}$ or Barium $Ba^{2+}$ atoms, which are coordinatively bound to oxygen atoms of the edges of the octahedral molecular crystals of $TiO_2$.

In yet another preferred embodiment, the alkaline earth metal cations are $Ca^{2+}$ cations, because the reaction is easier to control than in the case of Ba. The use of calcium cations is preferred because calcium hydroxide has a higher pKb basicity constant than barium hydroxide and, therefore, calcium hydroxide dissociates into ions much more easily than barium hydroxide. For $Ca(OH)_2$ the pKb basicity constant is 1.37 (first OH), 2.43 (second OH), and for barium hydroxide the pKb, the basicity constant is 0.15 (first OH), 0, 64 (second OH).

In yet another preferred embodiment, the invention relates to an inorganic pigment with the function of a light-activated catalyst, where perovskite or pseudo-perovskite inorganic ferroelectric structures of $ABO_3$ or $A_2B_2O_6$ type contain titanium as a "B" type transition metal, preferably rutile titanium, and calcium or barium as the alkaline earth metal, preferably calcium, as the "A" type cation, and the "O" anion is the oxygen.

In another preferred embodiment of the invention, the third layer consists of metal nanometric clusters where the metal is selected from Cu, Ag or Au deposited on the structure of the second layer.

In a particularly preferred embodiment, the metal clusters are formed of Cu, because the reaction is extremely easy to control and is economically efficient.

In a particularly preferred embodiment, the metal clusters where the metal is selected from Cu, Ag or Au deposited on the structure of the second layer have a thickness of 1 (one) to 5 (five) metal atoms, but is not more than 1 nm thick with a length within the range of 1 nm to 50 nm. Thickness of 1 (one) to 5 (five) metal atoms, but not more than 1 nm is what causes the cluster electrons to be located only on its surface, which makes the inorganic pigment of this invention act as a catalyst in the absence of light. These metal clusters are deposited on the two-dimensional pseudo-perovskite phase that forms the second layer of the pigment.

The inorganic pigment with the function of light-activated inorganic agents (LAIAs), described in this invention, has a "micronized" shape and is not included in the nanomaterials category, because the average dimensions of the micronized particle are of the size of the metal oxide semiconductor particle of $TiO_2$, i.e., less than 4 μm, but greater than 220 nm. Thus, the inorganic pigment composite complies with international standards that limit the use of nanometer-sized compounds.

Solids such as crystalline pigments are ordered molecules in the form of a crystal with a three-dimensional structure of homogeneous, anisotropic body, a structure organized by arranging the structural units of the solid (ions, atoms, molecules) in a well-defined order in three dimensions. This order takes place both within a limited group of structural units (local order) and over large areas (remote order). For the same chemical formula, special characteristic properties such as forbidden bandwidth, quantum effects, large specific surface area, chemical reactivity, vary greatly with particle size. Therefore, depending on the size of the crystalline particles, powdery solids are divided into two broad categories that have totally different chemical properties:

nanomaterials—with the size located within the nanoscale—1 nm to 100 nm;

bulk, micronized materials with sizes exceeding 100 nm, generally greater than 500 nm.

The chemical properties of powdery materials vary greatly depending on particular sizes. The dimensional distribution of a powdery material must be presented as the dimensional distribution depending on the concentration of the number of particles (i.e., the number of particles in a given size range divided by the total number of particles), not depending on the mass percentage of nanoscale particles, taking into account that a small mass percentage may contain the largest number of particles.

The light-activated inorganic agents (LAIAs) of this invention are characterized by the fact that their physical and chemical properties unexpectedly generate photocatalytic activity when irradiated with electromagnetic radiation from the entire visible spectrum (400 nm-700 nm), but it also has catalytic, bactericidal and virucidal activity in the dark, in the absence of light. The light-activated inorganic agents (LAIAs), described by this invention, have a "micronized" shape and do not fall into the category of "nanomaterials", as the medium size of the "micronized" particle is similar to those of the $TiO_2$ particle, i.e., less than 4 μm, but greater than 220 nm.

Figure 2:
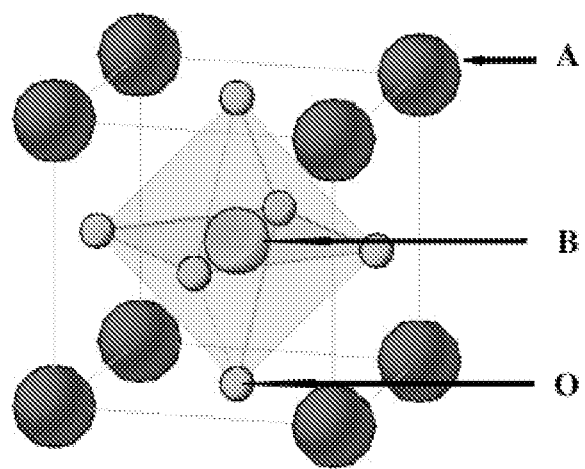

This invention uses a metal oxide structure of $ABO_3$ perovskite type, with a formula of $(^{XII}A^{2+\ VI}B^{4+}, O^{2-}_3)$ type, where the cation "A" is an alkali or alkaline earth metal, the cation "B" is a transition metal, "A" and "B" are two cations of different sizes, "A" atoms are larger than "B" atoms, as shown in FIG. 2:

"O" is an anion that binds to both cations, namely the oxygen anion,

"B" cation in coordination 6(VI) times, surrounded by an octahedron of anions, namely the titanium cation of the first layer, "A" cation in coordination with octahedral 12(XII) times.

From the point of view of the photocatalytic process, compounds having a perovskite structure offer significant advantages over informed binary oxides, because perovskites offer favourable bandwidth potential, allowing various photoinduced reactions. At the same time, perovskite or pseudo-perovskite structures are recognized as having ferroelectric properties.

A synergistic effect of the inorganic pigment of this invention results from the combination of the ferroelectric effect of perovskites with the photocatalytic effect of the semiconducting metal oxide which leads to an unexpected increase in photocatalytic activity.

However, in the case of perovskite or pseudo-perovskite metal oxide photocatalysts, the ability to use visible light is intrinsically restricted by wide bandwidths, which are caused by low-valence bands consisting of "2p" orbitals of oxygen.

This invention solves this problem by depositing on the surface of a first layer of rutile or anatase $TiO_2$, of perovskite-type structures or pseudo-perovskite-type structures of $ABO_3$ or $A_2B_2O_6$ form. In these structures, the "O" type anion is given by oxygen atoms from the interface of the first layer of $TiO_2$, and the transition metal cation of "B" type is represented by the titanium atoms from the interface of the first layer. The alkaline-earth type cation of "A" type is represented by the calcium or barium cations that are deposited on the surface of the first layer. Within the perovskite/pseudo-perovskite structure described in this invention, "B" metal cations—represented by titanium—are strongly bound to the oxygen anions of the perovskite/pseudo-perovskite structures. "B" transition metal cation, respectively titanium, is responsible for the catalytic activity of perovskite, and the role of the type "A" cation, represented by an alkaline earth metal, is to stabilize the unusual oxidation states of B cations by controlled formation of free crystal lattice positions, which lead to various unexpected catalytic performances. This phenomenon can also be defined as a co-activation of the $TiO_2$ support. On the surface of $ABO_3$ or $A_2B_2O_6$ perovskite or pseudo-perovskite structures, there are deposited nanometric copper metal clusters, clusters that induce an electric field in perovskite/pseudo-perovskite that influence the electronic states of HOMO bands of perovskite valence of $ABO_3$ formed by combining the electronic orbitals of oxygen and calcium atoms in perovskite. Under the influence of the field induced by copper metal clusters, the level of electronic energy in the $2p$ valence band (HOMO) of oxygen atoms to the conduction band (LUMO) is obtained, representing the free "d" orbitals in titanium atoms. The influence of the electrical field induced by the metal cluster coupled with $ABO_3$ perovskite will result in the decrease of the energy difference between the two bands (HOMO) and (LUMO) and it will be possible to polarize the pigment of this invention by the electrical field of electromagnetic radiation form the entire visible spectrum followed by the photoactivation of the catalyst throughout the visible spectrum.

The presence of the cations of alkaline earth metals of $Ca^{2+}$ or $Ba^{2+}$ between the octahedra of $TiO_2$ and the formation of coordinate bonds between the oxygen anions of $TiO_2$ and these alkaline earth metals of $Ca^{2+}$ or $Ba^{2+}$ will lead to the degeneration of electrons from the $2p$ molecular orbitals that form HOMO orbitals of the $TiO_2$ molecule. The electrical field generated by the dipoles formed by the metal nanometric clusters will further influence the delocalization of these HOMO valence electrons.

When the pigment described in this invention is irradiated with light quanta from the entire visible spectrum, the delocalized electrons, under the influence of electrical field changes of permanent dipoles in metal clusters will be expelled and will initiate a catalytic reaction under the influence of light-photocatalytic reaction.

When an electron-deficient molecule is adsorbed on the surface of the pigment described in this invention, a phenomenon occurring under the influence of the electrical field generated by dipoles formed by metal nanometer clusters, degenerated HOMO electrons that are delocalized by the electrical field generated by dipoles formed by nanometer metal clusters, will fulfil the deficiency of electrons of the molecule adsorbed on the surface of the pigment, initiating a chemical reaction without being irradiated by light—here the pigment acts as a catalyst, i.e. it has a catalytic effect in the absence of light.

In another example, the invention relates to a process for obtaining the inorganic pigment with the function of a light-activated catalyst comprising the following steps:

a) to a basic solution of 1M NaOH there is added an amount of semiconducting metal oxide selected from anatase or rutile $TiO_2$, preferably rutile, where the ratio between the mass of NaOH and the mass of semiconducting metal oxide is within the range of 1 to 8 parts up to 1 part by 10 parts in weight and must be stirred well for at least 30 minutes at room temperature to decontaminate the surface and the semiconducting metal oxide of any impurities and for the activation of the oxygen centers on its surface;

b) to the stirred solution from paragraph (a) there is added an amount of $M(OH)_2$, where the ratio between the mass of $M(OH)_2$ and semiconducting metal oxide added during step a) is within the range of 1:5 parts in weight up to 1:10 parts in weight, preferably 1:5 parts in weight, if stirring is continued for at least 30 minutes;

c) an amount of M'X is added to the solution from the previous step, where the ratio between the mass of M'X and the semiconducting metal oxide added during step b is within the range 1 to 8 parts in weight up to 1 to 25 parts in weight, preferably 1 to 12 parts in weight.

d) stirring of the solution to be continued for at least 15 minutes at room temperature, then increase the temperature, under continuous stirring, to boiling water temperature with continued boiling under stirring until the volume of the solution decreases by half and the solution becomes a thickened cream.

e) leave the product obtained during the previous stage at rest for 24 hours for maturation.

In a particular embodiment, during the process of obtaining the pigment of this invention:

the semiconducting metal oxide is rutile or anatase $TiO_2$, preferably rutile, with a high dielectric constant characterized by a relative permittivity εr within the range 60-100, for industrial use with a size within the range 220 nm to 4 μm, preferably within the range 220 nm up to 40 μm;

$M(OH)_2$ where M is chosen from Ca and Ba, preferably Ca, and

M'X where selected from $CuSO_4$, $AgNO_3$ or $AuNO_3$, preferably $CuSO_4$

In a particularly preferred embodiment, $AgNO_3$ is used.

In another and more preferred embodiment, $CuSO_4$ pentahydrate is used.

In a preferred embodiment, the metal nanometer clusters deposited on the structure of the second layer at a thickness of 1 (one) to 5 (five) metal atoms but not more than 1 nm thick with a length within the range from 1 nm to 50 nm, thickness that is responsible for catalytic activity in the absence of light, i.e., in the dark.

In another particularly preferred embodiment, the invention relates to a process for obtaining the inorganic pigment with the function of light-activated catalyst of this invention which comprises the following steps:

a) to a basic solution of 1M NaOH there is added an amount of rutile or anatase $TiO_2$, where the ratio between the mass of NaOH and the mass of $TiO_2$ is within the range of 1 to 8 parts to 1 part to 10 parts in weight and must be stirred well for at least 30 minutes at room temperature to decontaminate the surface of $TiO_2$ of any impurities and to activate the oxygen centers on the surface of $TiO_2$;

b) to the stirred solution from (a) there is added an amount of $Ca(OH)_2$, where the ratio between the mass of $Ca(OH)_2$ and $TiO_2$ added during step a) is in the range of 1:5 parts in weight to 1:10 parts in weight, preferably 1:5 parts in weight, if stirring is continued for at least 30 minutes;

c) an amount of $CuSO_4$ pentahydrate is added to the solution from the previous step where the ratio between the mass of $CuSO_4$ and $TiO_2$ added during step b is within the range 1 to 8 parts in weight up to 1 to 25 parts in weight, preferably 1 to 12 parts in weight.

d) stirring of the solution to be continued for at least 15 minutes at room temperature, then increase the temperature, under continuous stirring, to boiling temperature of the water, with continued boiling under stirring, until the volume of the solution decreases by half and the solution becomes a thickened cream.

e) leave the product obtained during the previous stage at rest for 24 hours for maturation.

The production process according to the invention is an environmentally friendly technology that does not generate hazardous waste, it is easy to carry it out with low production costs.

The perovskite/pseudo-perovskite layer is formed using a wet impregnation process and an electrochemical exchange reaction, through which alkaline earth metal cations, especially $Ca^{2+}$, are deposited. Among the alkali metals of main group II, $Ba^{2+}$ can also be used, but it is preferred using calcium because this reaction is easier to control. These procedures are performed in three stages.

STAGE 1—Surface preparation—during this step, the reaction mass of the semiconducting metal oxide selected from rutile or anatase $TiO_2$, preferably rutile, is mixed with a basic solution of 1M NaOH 1 with pH 14. The ratio between the mass of NaOH and the mass of $TiO_2$ is within the range of 1 to 8 parts to 1 part to 10 parts in weight. The NaOH solution has a specific role, it decontaminates and cleans impurities of the $TiO_2$ crystal surface and activates the oxygen centers on the $TiO_2$ crystal surface.

Figure 4:
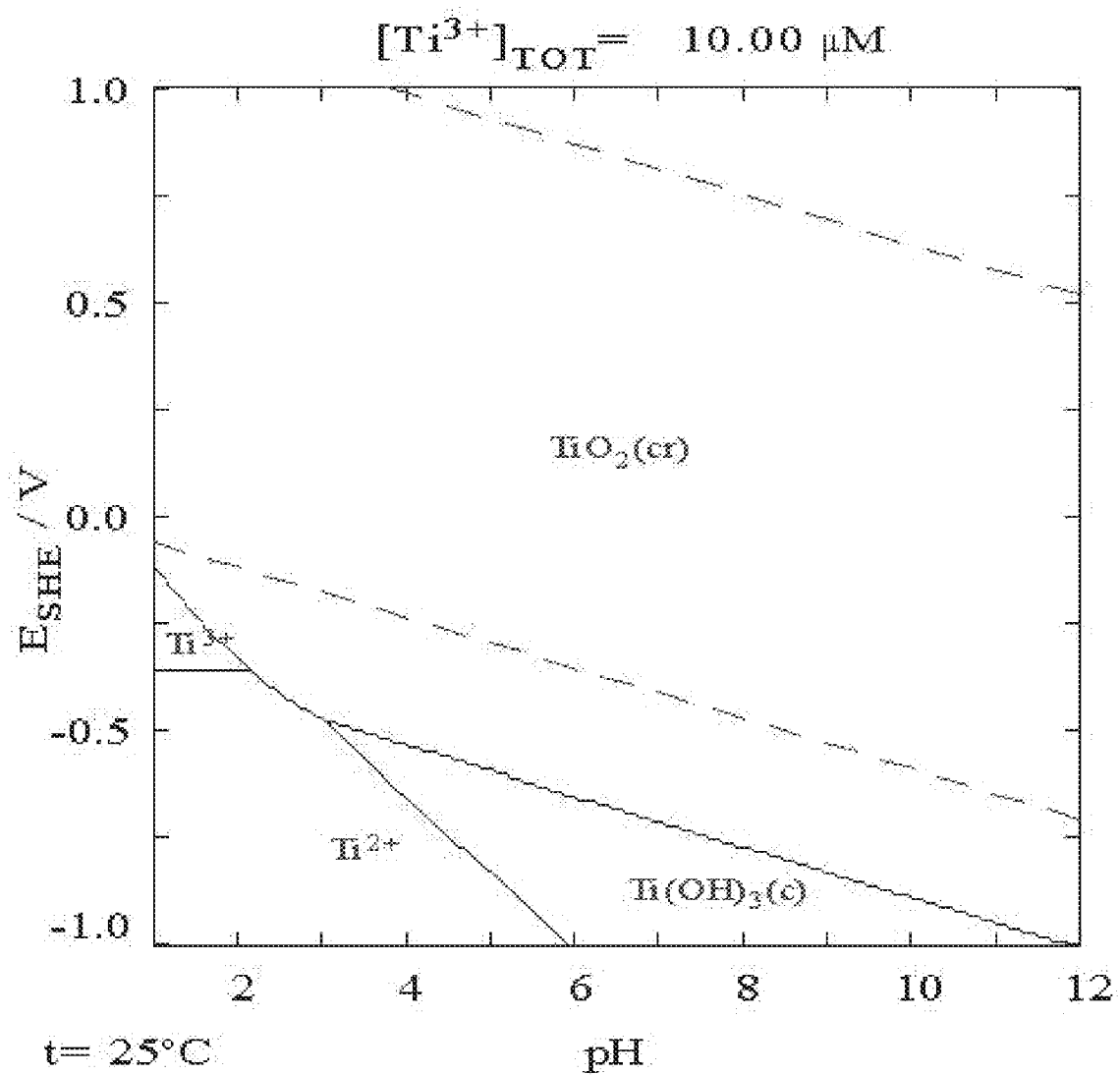
Figure 5:
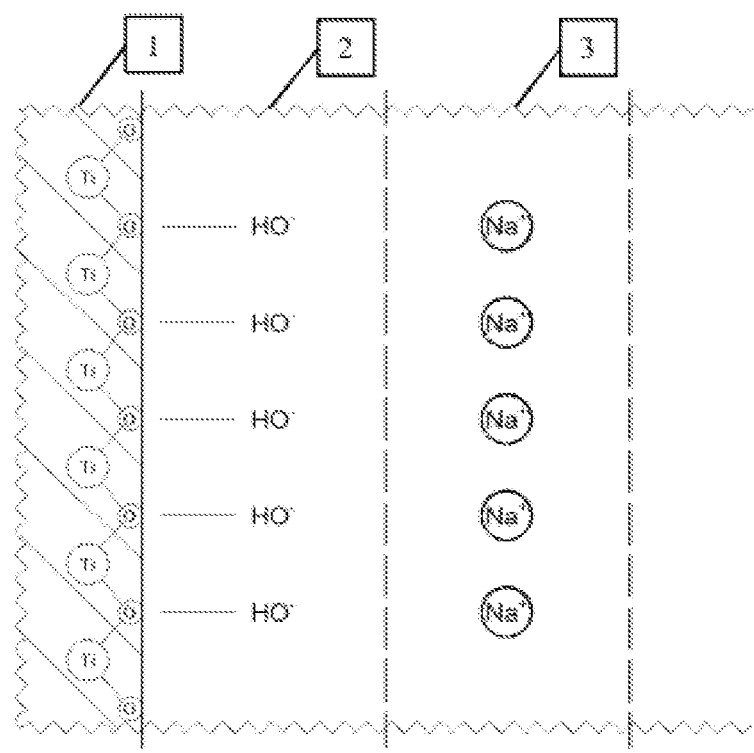

FIG. 4 shows the Pourbaix diagram for an aqueous solution of titanium, at a strongly basic pH the titanium oxide tends to form complex combinations of hydroxy titanates. Oxygen atoms on the surface of the $TiO_2$ crystal have chemical affinity with $OH^-$ hydroxyl groups with which they form hydrogen bonds. $OH^-$ groups are attached by hydrogen bonds to the oxygen centers on the surface of the $TiO_2$ crystal. As such, an electrical double-layer electrochemical interface (abbreviated SDE) appears on the surface of the $TiO_2$ crystal at the boundary between the surface of the $TiO_2$ crystal (which is similar to an electrode) and an electrolyte which in this case is the basic NaOH solution consisting of $Na^+$ cations and $OH^-$ anions. The first ion layer is negatively charged and consists of $OH^-$ anions that adhere strongly to the $TiO_2$ surface through hydrogen bonds made with oxygen atoms. This layer determines by Columbian effect the appearance of the second positively charged layer of $Na^+$ cations, a layer having opposite polarity in the area adjacent to the first $OH^-$ layer, according to the electrochemistry principles of charge compensation, as seen in FIG. 5.

STAGE II—Formation perovskite/pseudo-perovskite structures—During this stage, the formation of $ABO_3$ perovskite structures takes place on the surface of the first $TiO_2$ layer. In the simplest perovskite structures, of $ABO_3$ type, the cation "B" is a transition metal, in this case titanium, and the cation "A" is an alkaline earth metal, Ca or Ba, preferably Ca. This invention also describes a process by which an alkaline earth cation is deposited on the surface of the $TiO_2$ crystal and which will form a simple $ABO_3$-type perovskite structure with titanium and oxygen atoms on the surface of the $TiO_2$ crystal.

The process of forming perovskite/pseudo-perovskite structures on the surface of the $TiO_2$ crystal is thus carried out. A solution of Ca(OH)$_2$ is added to the solution from step a), where the ratio between the mass of Ca(OH)$_2$ and the mass of TiO$_2$ introduced in the reaction is 1:5 parts in weight up to 1:10 parts in weight. Although calcium hydroxide Ca(OH)$_2$ is relatively insoluble in water, being considered a sparingly soluble electrolyte, having a product (or solubility equilibrium constant) with K sp solubility of 5.5×10$^{-6}$, it is preferable to work with a Ca(OH)$_2$ solution, because the acid dissociation constant is high enough that the Ca(OH)$_2$ solutions have the acid-base dissociation reaction:

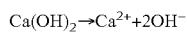

is a classification of metals in terms of electrochemical activity. According to the series of activation of Beketov-Volta metals, Ca$^{2+}$ and Ba$^{2+}$ cations are more reactive than Na$^+$ cations and have the ability to replace the Na$^+$ cation in solutions by ion exchange reactions. As such, in the electrical double layer on the surface of TiO$_2$ particles, Na$^+$ cations will be replaced with Ca$^{2+}$ cations (or Ba$^{2+}$ if working with barium), Ca$^{2+}$ and Ba$^{2+}$ cations having an electropositive character more accentuated than sodium.

A thermal dehydration reaction follows. Under the influence of temperature, water is removed, and the calcium cations in the electrical double layer on the surface of the TiO$_2$ particle bind in coordination with the oxygen and titanium atoms on the surface of the crystal and an elementary CaTiO$_3$ perovskite cell is formed, as per FIG. 6 (see figure in the appendix).

The factors that favour the formation of elementary structures of CaTiO$_3$ perovskite or Ca$_2$Ti$_2$O$_6$ pseudo-perovskite on the surface of the first layer are:
  in the case of bulk materials, at the interface of the actual surface there is a change of the structure of the electronic strip of the bulk material to vacuum, which involves the formation of new electronic states which are called surface states, states which are characterized by surface dipoles. In this case, from a thermodynamic point of view, the precursor may have a lower degree of freedom and will be retained on the crystalline support and transformed into a metal particle following thermochemical treatments.
  calcium has a strong electropositive character and affinity for orbitals containing non-participating electrons, will attract 2d non-participating electrons from oxygen atoms on the surface of the TiO$_2$ crystal to which it will coordinate
  the size of the elementary CaTiO 3 cell which has a network constant almost identical to that of TiO$_2$. Furthermore, Goldschmidt tolerance factor when using calcium has a value of almost 0.9, ideal for perovskite structures.

By thermal removal of water, calcium cation, bound by Colombian attraction? to the hydroxyl groups on the surface of the TiO$_2$ crystal, lose the hydroxyl groups and coordinate with the oxygen atoms. The increase in temperature causes the enthalpy of the system to increase and will lead to the rupture of the hydrogen bonds between the hydroxyl groups in the interface layer and the oxygen atoms on the surface of the TiO$_2$ crystal; and oxygen atoms are coordinatively bonded with calcium cations. Calcium has a strong electropositive character and affinity for orbitals containing non-participating electrons, will attract 2d non-participating electrons from oxygen atoms on the surface of the TiO$_2$ crystal, will be coordinatively bonded with these oxygen atoms and thus form with titanium atoms and of oxygen an elementary cell of perovskite of CaTiO 3 type. This type of arrangement is a two-dimensional (2D) material, and the system is quantum limited in the direction perpendicular to the material plane and has a static electrical dipole moment, the pyroelectric property involving 3d orbitals of the transition metal and 2p orbitals of the oxygen atom that coordinates with calcium cations. As an arrangement, layer structures with the thickness of one or two ferroelectric inorganic octahedral crystals are formed, layers that appear as two-dimensional plates of octahedral molecular crystals of TiO$_2$ between which are interposed with calcium Ca$^{2+}$ cations, Ca$^{2+}$ cations bond in coordination with oxygen atoms in the TiO$_2$ orthorombic crystals edges. This layer is called the pseudo-perovskite phase, being strongly adherent to the surface of the first layer and is similar to an ABO 3 type perovskite where the "O" type anion is given by oxygen atoms at the interface of the first layer formed of TiO$_2$, and the transition metal cation of "B" type is represented by the titanium atoms at the interface of the first layer-second layer. The "A" type cation consists of Calcium Ca$^{2+}$ atoms that are bond in coordination with oxygen atoms in the TiO$_2$ octahedral molecular crystals edges.

STAGE III—formation of the layer of nanometric metal clusters where the metal is selected from Cu, Ag and Au, preferably Cu, deposited on the two-dimensional perovskite/pseudo-perovskite layer. This last layer has the role of generating a surface plasmonic field. These nanometric metal clusters form a semiconductor metal-dielectric junction with the surface of the perovskite/pseudo-perovskite crystals of the Schottky junction-type. This Schottky junction-type has the role of forming an electric dipole, an electric dipole which will generate both an electric field which degenerates the electrons of the coordinating bond of Calcium and oxygen in perovskite, and also the surface plasmonic polaritons (SPP) in the form of electromagnetic waves which move along the metal interface—dielectric perovskite/pseudo-perovskite.

This junction is characterized by the generation at its level of electron-gap pairs, where the gaps are positive charges, in the form of metal cations of M$^{2+}$, immobile in the cluster structure, and the negative charge is given by free electrons delocalized in the form of electronic cloud at the surface of the cluster. The Schottky junction will therefore polarize the cluster-perovskite interface and will generate an electric dipole moment of the interface, a dipole moment accompanied both by the appearance of a permanent electric field located at the Schottky junction interface, and by the appearance of the surface plasmon resonance phenomenon under the influence of an external electric field, respectively under the influence of the electric field of the electromagnetic radiation in the visible field. The electric field characterized by the existence of the electron-gap pairs can move only along the surface of the cluster and form polarized absorption bands along the axes of symmetry of the crystal. Therefore, these electron-gap pairs can function as a catalytic surface for chemical reactions, where chemical species with free electrons can be adsorbed to the gaps in the cluster, and these chemical species are activated and reactions can be catalyzed by these cluster-perovskite interfaces.

The electric field generated by the dipole formed at the interface of the Schottky junction between the cluster and the perovskite will degenerate the electrons from the 2p orbitals which form the calcium-oxygen coordination bond of the perovskite structure. Therefore, the electromagnetic oscillations generated by the plasmonic resonance phenomenon on the cluster surface, a phenomenon which occurs under the electric field of light radiation in the visible field, will lead to the excitation of the 2p degenerate electrons of oxygen from the calcium-oxygen perovskite coordination bond and shall migrate from the valence band into the LUMO conduction band represented by 3d free orbitals of titanium atoms, generating a photocatalytic response under the action of light in the visible field.

Figure 7:
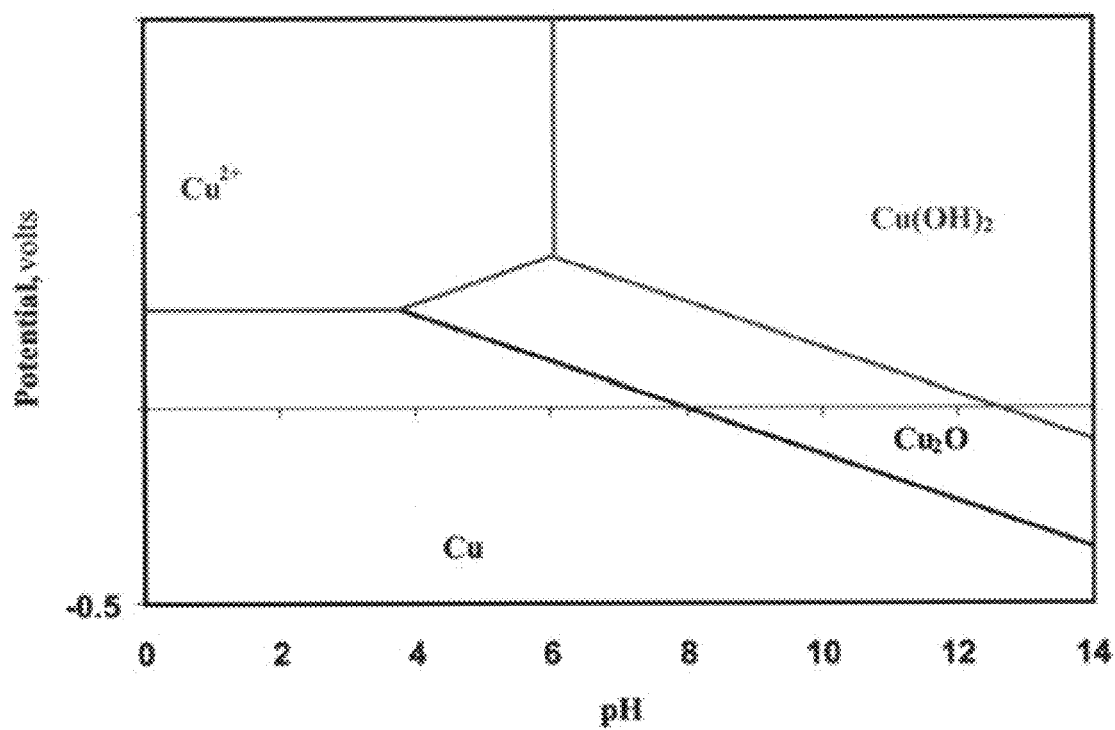
Figure 8:
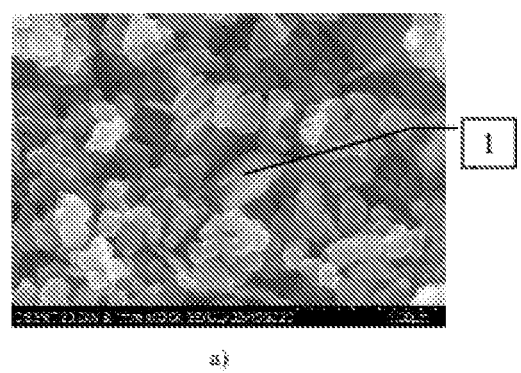
Figure 8:
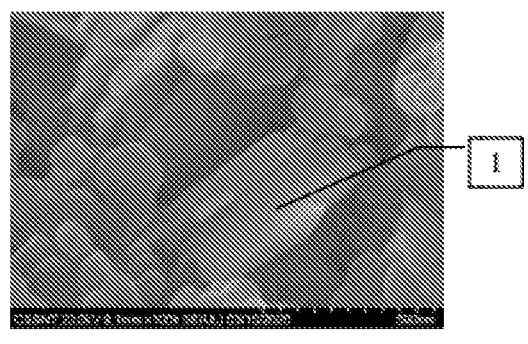

The use of copper is preferred due to the fact that it is a good conductor of electricity, has chemical stability and is easy to polarize. FIG. 7, which represents the Pouboix diagram for copper, shows that in very basic solutions copper can be deposited as a metal. A sol gel deposition process is used, using an insoluble copper base—copper hydroxide—which is prepared in situ. Copper ions are attracted by the dipoles on the oxide surface, and at $Cu(OH)_2$ temperature they decompose and form nanometric layers of copper on the surface of two-dimensional $CaTiO_3$ perovskite structures. The deposition of copper clusters can be emphasized in FIG. 8. A pigment sample was analyzed with a Hitachi SU 8230 scanning microscope equipped with EDX Oxford detector. Image a) and b) show the copper cluster deposited on the two-dimensional perovskite/pseudo-perovskite layers.

Figure 1:
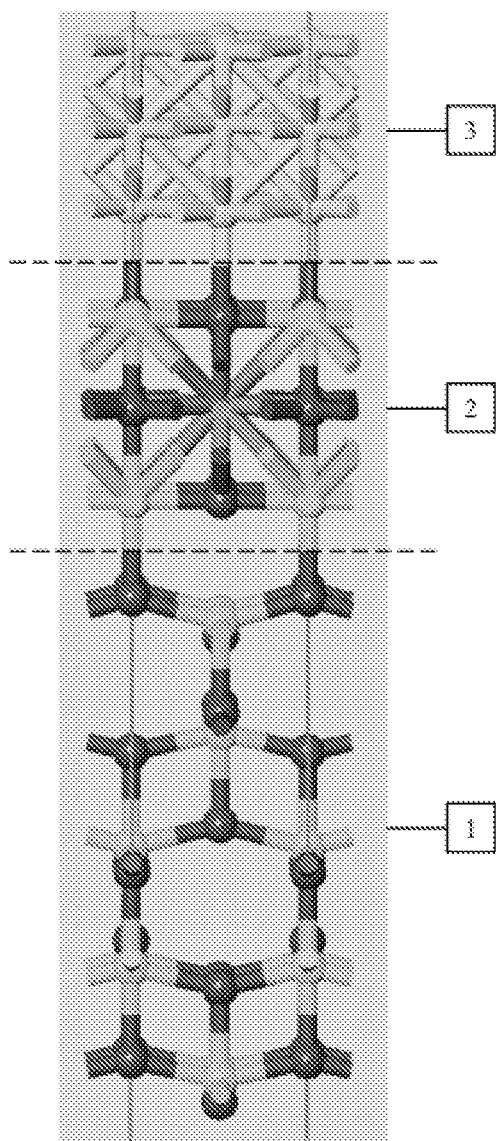

Thus, a structure with three states is formed: the first layer of $TiO_2$, the second layer—the two-dimensional layer of perovskite/pseudo-perovskite $CaTiO_3$ and the third layer the nanometric metallic clusters (see FIG. 1).

By the process described in the present invention, an inorganic pigment with the function of light-activated inorganic agents—LAIAs is obtained, with the function of photocatalyst and catalyst (in the absence of light) formed by a relatively co-activated inert support ($TiO_2$ particles), particles that provide support for nanometric perovskite/pseudo-perovskite structures on which nanometric metal clusters are deposited.

It is in the Schottky metal-semiconductor junction, formed by the perovskite structure with metal nanoparticles, that the interaction between the semiconductor and the strongly localized surface of plasmon resonance (LSPR) induced electric fields, caused by electromagnetic phenomena in the near field to the metallic nanostructure actually takes place. After photo-exciting the plasmonic nanostructures, the electromagnetic field is amplified by several orders of magnitude in nanostructures. These created fields are spatially heterogeneous; and at the surface of the nanostructure, the field intensity is the highest. At 20-30 nm from the surface, the field intensity experiences an exponential decrease with the distance. Beyond 30 nm, the field intensity decreases linearly with the distance. Thus, a semiconductor could interact with a sufficiently strong electric field at some nanometers distance away from the photo-excited plasmonic nanostructures. Therefore, these plasmonic electric fields which appear at the level of these perovskite sites can also influence and generate electro-gap pairs in the pure crystal mass of $TiO_2$, amplifying the photocatalysis process.

The concentrated solution of inorganic pigment with the function of light-activated inorganic agents— LAIAs obtained by the process described by the present invention can be used as such and added in various compositions with a wide range of industrial applicability.

The concentrated solution of inorganic pigment with the function of light-activated inorganic agents— LAIAs obtained by the process described by the present invention can be dried and calcined in calcination furnaces at a temperature of 200° C.-300° C. for 3-4 hours. The mass of dry matter obtained after calcination is ground down to the desired granulation in ball mills. This calcination stage is used when it is desired to obtain a powder to be introduced into various building materials or to obtain polymeric compounds with photocatalytic properties made from organic resins dissolved in organic solvents.

The powder obtained after the grinding stage can be used in the same way as the solution in different compositions to improve their bactericidal effect.

This production process is very advantageous because the raw material is cheap and easy to procure.

Another advantage of the process is that very good yields of about 40% of inorganic pigment with the function of light-activated inorganic agents— LAIAs are obtained compared to the processes used in the preceding technic that starts from precursors or which led to the obtaining of nanoparticles with very low yields, of approximately 5-10%.

Another advantage of the process is that there result no toxic compounds, so this production process can be considered as part of green chemistry.

Another advantage of the process is that an industrial inorganic pigment with the function of light-activated inorganic agents— LAIAs is obtained based on $TiO_2$ rutile, which is a cheap and easy-to-procure compound in the industry. About 80% of world consumption of $TiO_2$ is the rutile form of $TiO_2$.

It is a simple process that leads to obtaining the useful product with high yield (approximately 40%). Also, another important advantage is that the reaction is easy to control. Au, Ag ions can also be used for the third layer, but Cu is preferred because it is cheap and has a more pronounced electropositive character than Au and Ag. It is not recommended to use other transition metal cations such as Ni, Fe, V, Cr, Co, transition metals that also have unoccupied orbitals, but these metals are in the activity series of Beketov-Volta metals before hydrogen, and they cannot form clusters on the surface of the perovskite layers.

It is recommended that the ratio of the mass of metal deposited as nanometric clusters and the mass of semiconductor metal oxide be 1:8 to 1:25 parts by weight, preferably 1:12 parts by weight.

In another example, the invention relates to various formulations which contain as active ingredient the pigment according to the invention selected from any composition suitable for coating surfaces with a decorative or protective role. In a particularly preferred embodiment, the formulations are selected from paints, resin, polymeric plastics, ceramic glazes or industrial ceramics.

Another object of the present invention is to provide formulations comprising as active ingredient the pigment with the function of light-activated inorganic agents— LAIAs according to the invention. These formulas are obtained by adding the pigment solutions described by the invention in these various formulas.

In a preferred embodiment, inorganic pigment powder with the function of light-activated inorganic agents— LAIAs, but also in the absence of light can be incorporated into various compositions as, but not limited to, paints, or any surfaces' coating composition for decorative or protective role, resin, polymeric plastics, ceramic glazes or industrial ceramics.

In another example, the invention refers to building materials which comprise as active ingredient the inorganic pigment with the function of light-activated catalyst, but also in the absence of the light described by the invention, the building materials selected from plasters, concrete, mortars, cement, plasticized or unplasticized paper or paperboard, polymeric and bituminous protective membranes, self-cleaning coating membranes, asphalt or asphalt or bituminous mixtures, self-cleaning building slabs or filler material, where the pigment composite described in the present invention is used as ingredient in the form of additive powders in these materials and to which they confer catalytic properties due to the specific catalytic function of this pigment compound described in the present invention. The advantage of these new building materials is that they have catalytic properties in the entire visible spectral range due to the specific catalytic function, these being photo catalytically active under the influence of light from the entire visible spectrum.

In another example, the invention relates to cosmetic products which comprise as active ingredient the inorganic pigment with the function of light-activated catalyst, but also in the absence of light described by the present invention selected from the class of dermatological products with antibacterial effect by application on skin. In a particularly preferred embodiment, the cosmetics are selected from creams, ointments, suspensions, aqueous solutions wherein the pigment compound described in the present invention is used as an ingredient in these cosmetic products. The advantage of these new cosmetic products is that they have catalytic properties in the entire visible spectral range, but also in the absence of light.

In another preferred embodiment, the concentrated solution of inorganic pigment with the function of light-activated inorganic agents— LAIAs, but also in the absence of light according to the invention can be incorporated into cosmetic products with bactericidal effect or cosmetics, including those for sun protection.

Another scope of the present invention refers to a method for destroying the pathogen factors, which consists in the application of a formula containing as active ingredient the pigment described by the present invention on the surface to be sanitized. This method is extremely easy to apply, comprising the following steps:
application on the surface to be sanitized, and
optionally, its exposure to visible or dark light radiation.

TESTS AND DETERMINATIONS

Tests for Determining the Photocatalytic Efficiency

In order to prove the efficacy of the new inorganic pigment with the function of catalyst, as described in the present invention, photocatalytic efficiency tests were performed. A pigment sample prepared according to the invention was subject to tests for determining the photocatalytic activity using an internal method developed on the basis of DIN 52980: 2008-10 "Photocatalytic activity of surfaces-Determination of photocatalytic activity by degradation of methylene blue", respectively ISO 10678-2010 "The determination of photocatalytic activity of surfaces in an aqueous medium by degradation of methylene blue". The experimental data showed that the analyzed sample displays photocatalytic activity both on irradiation exclusively with light from the near UV domain, and on irradiation exclusively with visible light, as follows:
on irradiation with light from the near ultraviolet range (300-400 nm), manifested by the discoloration of an aqueous solution of Methylene Blue of 20 mg/L concentration, with an average specific photocatalytic activity $P_{MB}$=3.15×10−5 mol/m²h;
on irradiation with visible light (400-800 nm), manifested by the discoloration of an aqueous solution of Methylene Blue of 20 mg/L concentration, with an average specific photocatalytic activity $P_{MB}$=0.46×10$^{-5}$ mol/m²h;
on irradiation with arc-xenon light, manifested by the discoloration of an aqueous solution of Methylene Blue of 20 mg/L concentration, with an average specific photocatalytic activity PMB=0.64×10$^{-5}$ mol/m²h;

The lighting sources used for photoexcitation were: A) for the ultraviolet field:
OSRAM HQE 40 UV lamp (emission spectrum in the range 300 nm≤λ≤420 nm, with an irradiance E=(20±0.5) W/m2 (measured at the level of the tested sample); B) for the visible range: LED projectors (emission spectrum exclusively in the range 400 nm≤λ≤800 nm, with an irradiance E=(15±0.5) W/m2 (measured at the level of the tested sample) and C) for the UV-Vis range (simulated solar light): ATLAS NXe 2000 HE arc-xenon lamp (emission spectrum exclusively in the range 300 nm A 800 nm, with an irradiance E=(42±0.5) W/m2 (measured at the level of the tested sample). A 10 ppm methylene blue solution was used.

Figure 10:
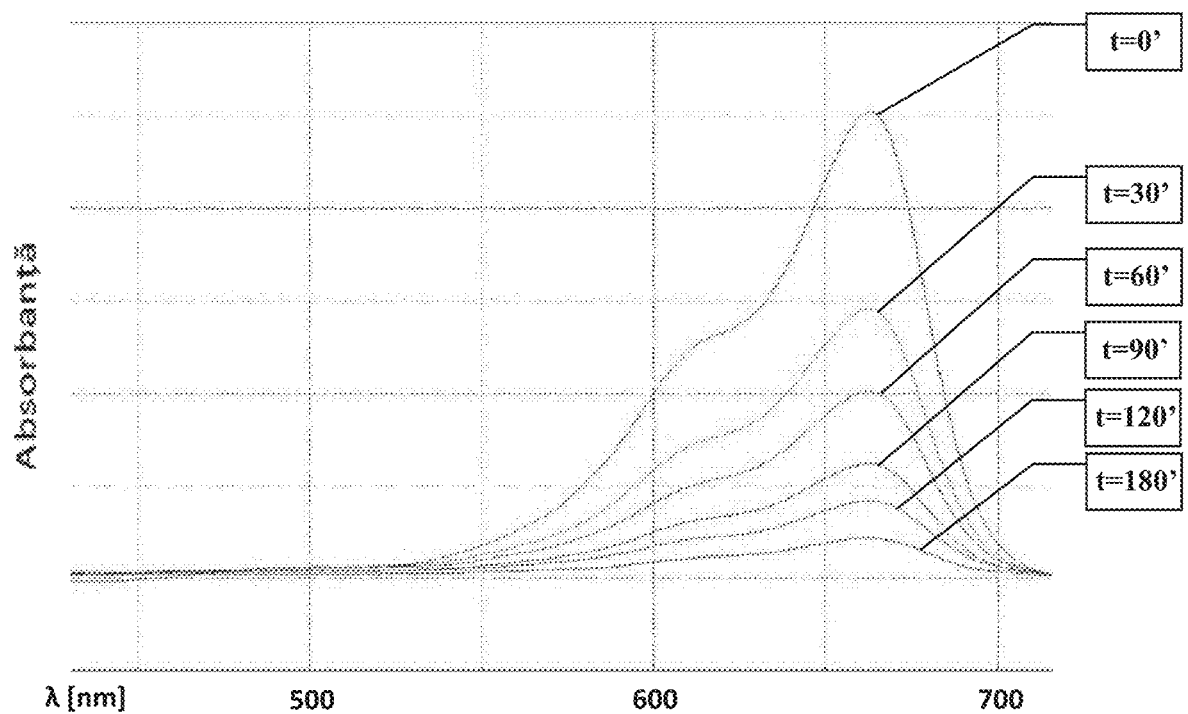
FIG. 10 represents the spectral measurements of the photocatalytic activity.

After irradiation of the sample with visible light, 1 mL of methylene blue solution was collected and the absorbance of the solution was measured. The measurements were made in 30-minute stages. The annex shows the absorbance graph of the methylene blue solution starting with the moment t=0 until the complete discoloration of the solution, respectively for 180 minutes. The moment t=0 shows the maximum absorption of the methylene blue solution with a concentration of 20 ppm at the beginning of the experiment. As the experiment progresses, a photocatalytic reaction occurs upon irradiation of the sample with visible light. The photocatalytic reaction generates reactive species that act on the methylene molecules and as a result of these reactions the concentration of the methylene blue solution decreases. The measurements performed every 30 minutes show us how the concentration of methylene blue solution decreases and allow us to evaluate the rate of photocatalytic reactions initiated at the pigment surface. FIG. 10 shows the results of the spectral measurement of the photocatalytic activity and shows the results recorded for the absorbance of the methylene blue solution. It was observed that after 210 minutes the methylene blue solution completely discoloured as a result of the photocatalytic reactions.

Figure 9:
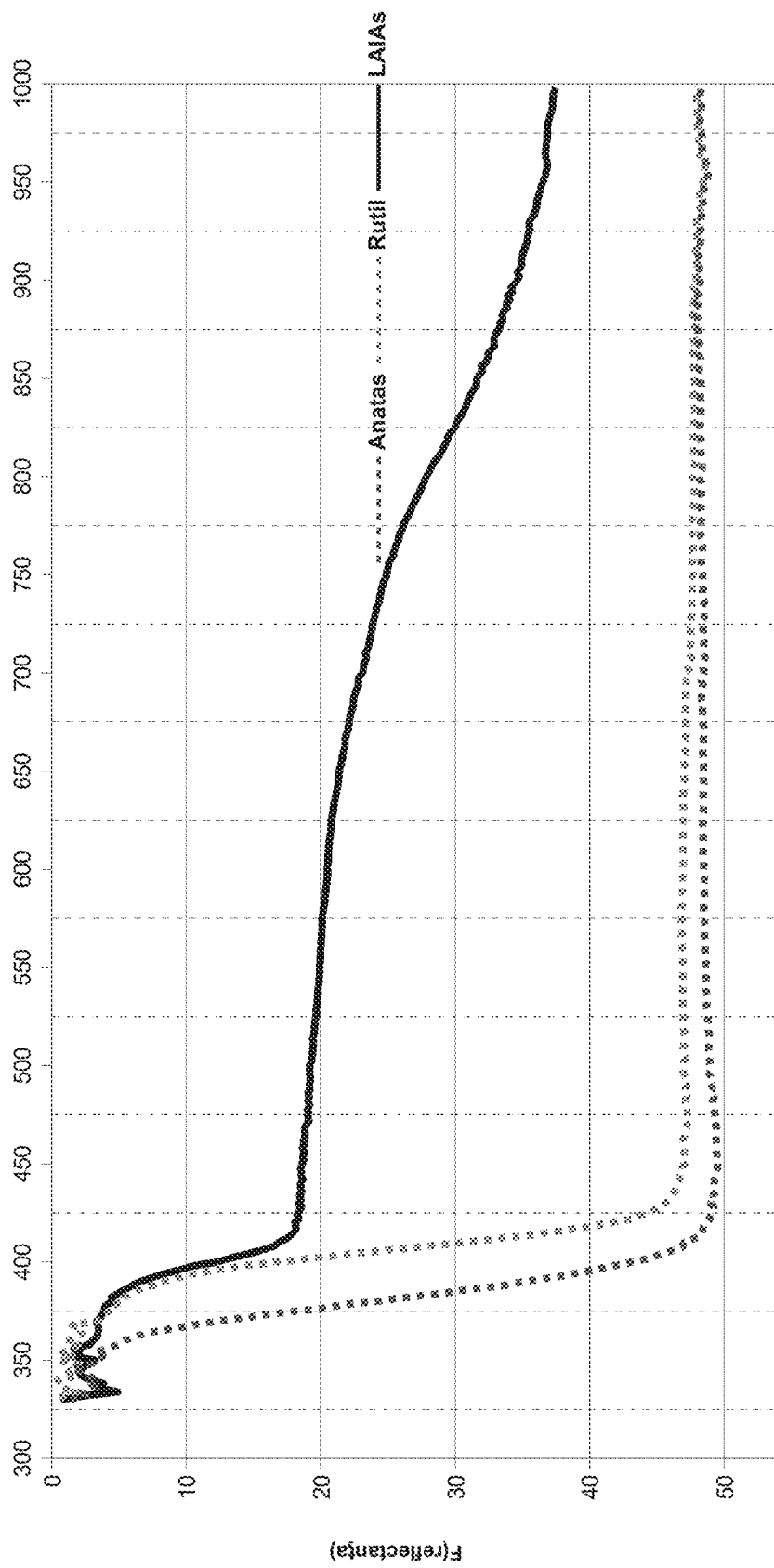

The pigment described by the present invention has an improved photocatalytic effect, having photocatalytic activity on the entire visible spectrum 400 nm-700 nm. Photoexcitation is done on the entire visible spectrum. FIG. 9 shows the result of recording the light absorption as a function of the reflectance recorded for a sample of LAIAs pigment compared to a sample of anatase $TiO_2$ and a $TiO_2$ rutile sample, both of industrial origin. A SPECORD 250-222P108 spectrophotometer was used for the measurements.

XPS Spectroscopy Tests

Figure 11:
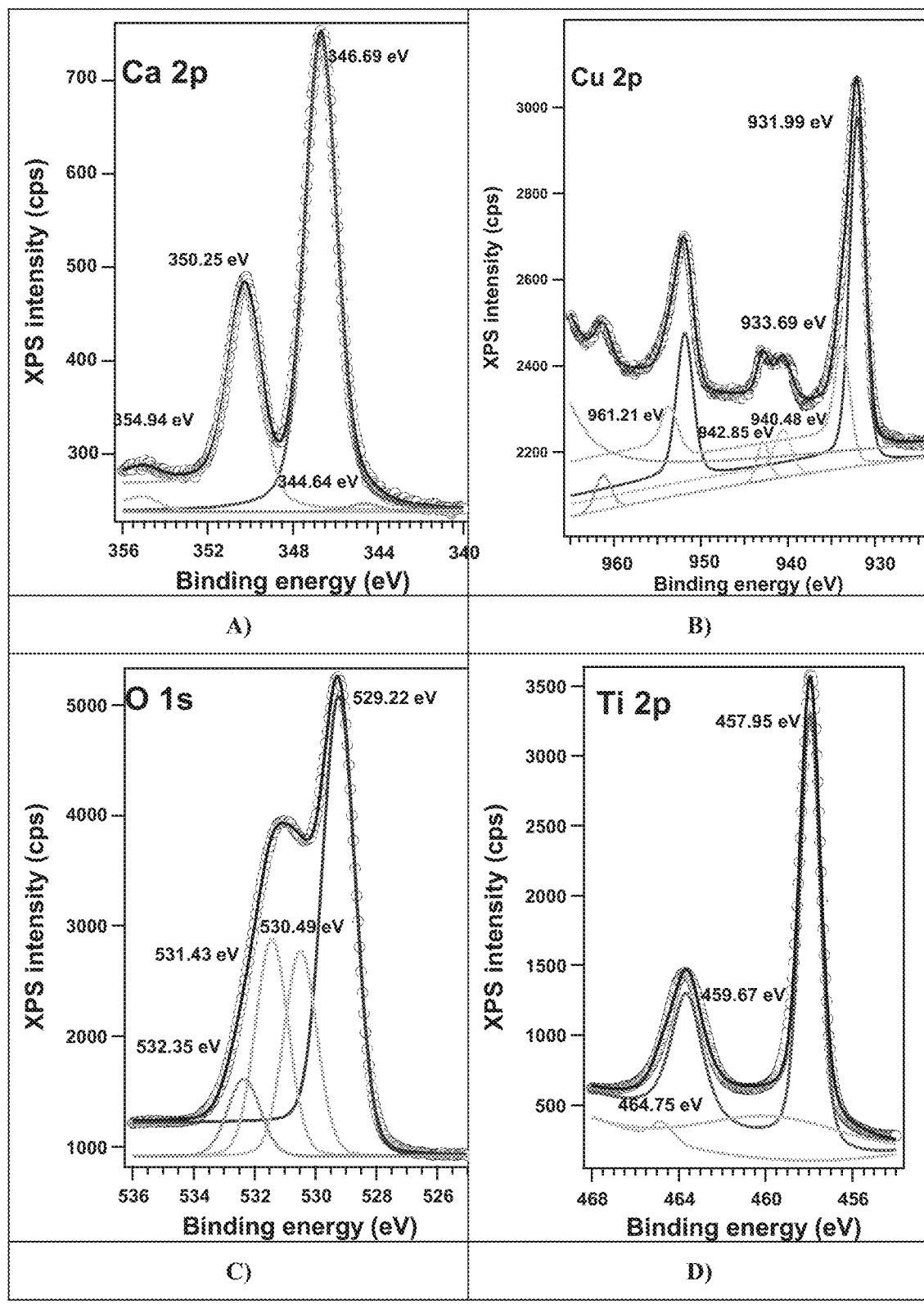
FIG. 11 represents the XPS spectra obtained for a sample of inorganic pigment with the function of light activated catalyst, spectra which are characteristic of a $CaTiO_3$ perovskite structure.
Figure 12:
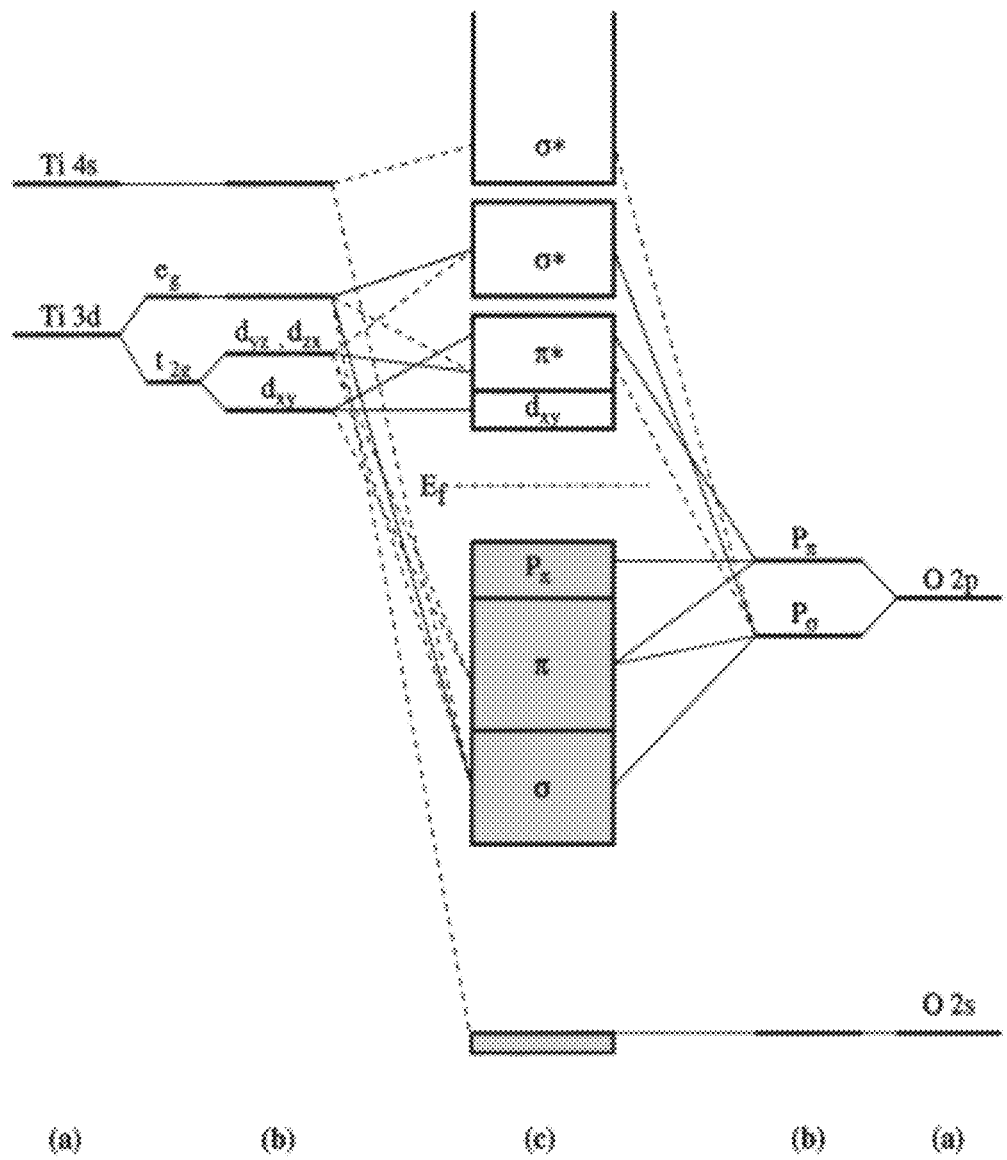
FIG. 12 represents the molecular-orbital bond structure for the $TiO_2$ molecule: (a) atomic levels, (b) divided levels of the crystal field; and (c) final states of interaction.

On a sample of inorganic pigment with the function of light-activated catalyst described in the present invention, X-ray Photoelectron Spectroscopy (XPS) tests were performed to confirm the structure of the pigment obtained. FIG. 11 shows the XPS spectra obtained for a sample of light-activated inorganic agent where in box A the spectrum for Ca2p is shown, in box B the spectrum for Cu 2p is shown, in box C the spectrum for O 1s is shown and in box D the spectrum for Ti2p is shown. From the spectrum analysis for Cu 2p we observe the Cu 2p3/2 peaks, the Cu 2+ satellites (the peaks at ~940 eV and 942 eV) and Cu 2p1/2. At Cu2p3/2 the most intense peak at 931.99 eV indicates the presence of metallic copper, and from the amplitudes it appears that it is a metallic copper component, deposited on the sample surface. O1s has a main component at 529.22 eV but also a smaller one at 530.49 eV, and corroborated with the Ti2p and Ca2p peaks, we conclude that on the surface of the pigment there are perovskite $CaTiO_3$ formations.

Specific Embodiment

The inorganic pigment with the function of light-activated inorganic agents LAIAs obtained by this process is an industrialized bulk-type inorganic pigment (bulk), for industrial use as defined in accordance with ISO 591-1: 2000, with photocatalytic activity in the entire visible spectral range, but also catalytic activity in the absence of light, due to the polarization phenomenon at the surface. It can be incorporated into various formulas to produce various products which thus receive photocatalytic activity in the visible field. The inorganic pigment with the function of light-activated inorganic agents LAIAs can be introduced by classical technologies in paints, different compositions of resins, ceramics, coating polymers, various building materials such as mortars, cement, putties, glazes, asphalt, cosmetics or skin-care products, generally in any product to which $TiO_2$-type semiconductor metal oxides are added as a filler agent or filler pigment. In a specific embodiment, which is mentioned only for illustration purposes, without limiting in any way the present invention, the process for obtaining the inorganic pigment with the function of light-activated inorganic agents LAIAs, but also in the absence of light comprises the following steps:
1. prepare a basic solution of 1M NaOH by adding 60 kg of NaOH to 1500 l of distilled water.
2. To the solution mentioned at point 1 add 500 kg of rutile $TiO_2$, industrial White Pigment 6 (PW6), TYTANPOL®—commercial product—Titanium dioxide.
3. Stir the solution well for at least 30 minutes at room temperature in order to obtain the decontamination of the $TiO_2$ surface from any impurities and to activate the centers of oxygen from the $TiO_2$ surface.
4. After 30 minutes of stirring, add 100 kg of $Ca(OH)_2$ and continue stirring for at least 30 minutes.
5. After stirring for at least 30 minutes, to the solution mentioned at point (3) add a mass of 40 kg of copper sulphate industrial pentahydrate $CuSO_4*5H_2O$. The solution thus formed has to be stirred for at least 15 minutes and then the temperature has to be increased, with continuous stirring, to a water-boiling temperature of 100 degrees Celsius.
6. Continue boiling and stirring until the volume of the solution decreases by half, and the solution acquires the structure of a thick cream. After boiling, the solution is left to mature for 24 hours, the product quality checks are made (photocatalytic activity, pH, viscosity, granulation) and then is introduced into the manufacturing process.

In another specific embodiment, which is mentioned only for illustration purposes, without limiting in any way the present invention, the process for obtaining the inorganic pigment with the function of light-activated inorganic agents LAIAs can be performed using silver or gold salts.

The process for obtaining the inorganic pigment with the function of a light-activated inorganic agents LAIAs consists of the following steps:
1. prepare a basic solution of 1M NaOH by adding 60 kg of NaOH to 1500 l of distilled water.
2. To the solution mentioned at point 1 add 500 kg of rutile $TiO_2$, industrial White Pigment 6 (PW6), TYTANPOL®—commercial product—Titanium dioxide.
3. Stir the solution well for at least 30 minutes at room temperature in order to obtain the decontamination of the $TiO_2$ surface from any impurities and to activate the centers of oxygen from the $TiO_2$ surface.
4. After 30 minutes of stirring, add 100 kg of $Ca(OH)_2$ and continue stirring for at least 30 minutes.
5. After stirring for at least 30 minutes, to the solution mentioned at point (3) add a mass of 17 kg of silver nitrate $AgNO_3$. The solution thus formed has to be stirred for at least 15 minutes and then the temperature has to be increased, with continuous stirring, to a water-boiling temperature of 100 degrees Celsius.
6. Continue boiling and stirring until the volume of the solution decreases by half, and the solution acquires the structure of a thick cream. After boiling, the solution is left to mature for 24 hours, the product quality checks are made (photocatalytic activity, pH, viscosity, granulation) and then is introduced into the manufacturing process.

The invention claimed is:

1. An inorganic pigment with the function of a light-activated catalyst but also in the absence of light comprising:
    a first layer composed of $TiO_2$ with high dielectric constant characterized by a relative permittivity εr in the range 60-100 and with a size in the range 200 nm up to at 4 μm;
    a second layer called a two-dimensional pseudo-perovskite layer which consists of inorganic ferroelectric structures of the perovskite or pseudo-perovskite type of the $ABO_3$ or $A_2B_2O_6$ form; and
    a third layer consisting of nanometric metal clusters that are deposited on the structure of the second layer.

2. The inorganic pigment according to claim 1, wherein the second layer, called the two-dimensional pseudo-perovskite phase layer, consists of molecular octahedra of $TiO_2$, which form the surface of the interface of the first layer, between which alkaline earth metal cations are inserted, which form a perovskite or pseudo-perovskite ferroelectric inorganic structure of type $ABO_3$ or $A_2B_2O_6$ where the "O" type anion and the "B" type cation are represented by the oxygen anions and titanium cations of the molecular octahedra of $TiO_2$ from the composition of the surface of the first layer interface, and the "A" type cation is represented by the intrusions of alkaline earth metals, which are coordinated to the "O" anions of $TiO_2$ molecular octahedra in the layout of the surface of the first layer interface.

3. The inorganic pigment according to claim 1, wherein the perovskite of pseudo-perovskite inorganic ferroelectric structures of type $ABO_3$ or $A_2B_2O_6$ contain Titanium as a "B" type transition metal.

4. An inorganic pigment according to claim 1, wherein the third layer consists of metal nanometric clusters of Cu, Ag or Au, which are deposited on the structure of the second layer.

5. An inorganic pigment according to claim 4 wherein the metal clusters deposited on the structure of the second layer have a thickness of from 1 to 5 metal atoms but not more than 1 nm thick with a length in the range of at 1 nm to 50 nm.

6. A process for obtaining the inorganic pigment with the function of light-activated catalyst but also in the absence of light according to claim 1, comprising the following steps:
    (a) to a basic NaOH 1M solution is added to an amount of semiconductor metal oxide of $TiO_2$, where the ratio between the mass of NaOH and the mass of semiconductor metal oxide is in the range of 1 to 8 parts until 1 part to 10 parts by weight and shake well for at least 30 minutes at room temperature to decontaminate the surface of the semiconductor metal oxide from any impurities and to activate the oxygen centers on its surface;

(b) to the stirred solution from point (a) is added an amount of $M(OH)_2$ where the ratio between the mass of $M(OH)_2$ and semiconductor metal oxide added in step (a) is in the range of 1:5 parts in weight to 1:10 parts by weight, and stirring is continued for at least 30 minutes;

(c) an amount of M'X is added to the solution from the previous step where the ratios between the mass of M'X and the semiconductor metal oxide added in step (b) is in the range of 1:8 parts by weight up to 1:25 parts by weight;

(d) continue stirring the solution for at least 15 minutes at room temperature, then increase the temperature, under continuous stirring, to boiling water with continued stirring until the volume of the solution decreases by half and the solution acquires the structure of a thick cream; and (e) leave the product obtained in the previous stage at rest for 24 hours for maturation.

7. The process for obtaining the inorganic pigment of claim 6 wherein:

the semiconductor metal oxide, with high dielectric constant characterized by a relative permittivity εr in the range 60-100, with a size in the range 200 nm up to at 4 μm;

M is chosen from Ca and Ba; and

M'X where selected from CuSO4, Ag NO3, or Au NO3.

8. The process for obtaining the inorganic pigment of claim 6, wherein the metal nanometric clusters deposited on the structure of the second layer have a thickness of from 1 to 5 metal atoms but not more than 1 nm thick with a length in the range of 1 nm to 50 nm.

9. Formulations comprising the inorganic pigment with the function of light-activated catalyst but also in the absence of light according to claim 1, selected from any formulation suitable for covering surfaces with a decorative or protective role, preferably of paints, resins, plastics polymeric, ceramic glazes, or industrial ceramics.

10. Construction materials comprising the inorganic pigment with the function of light-activated catalyst but also in the absence of light according to claim 1 selected from plasters, plastics or mortar, plastic or unplasticized paper or paperboard, polymeric protective membranes, and bituminous, self-curing coatings, asphalt, asphalt mixtures, or bituminous mixtures, self-curing building slabs or fillers, added powders which give them catalytic properties.

11. Cosmetic products comprising the inorganic pigment with the function of a light-activated catalyst but also in the absence of light according to claim 1 selected from the class of dermatological products with antibacterial effect by application to the skin.

12. A method of destroying pathogens comprising applying a formulation containing as an active ingredient the pigment of claim 1 comprising the following steps:

application of the formulation on the surface to be sanitized; and optionally, its exposure to light radiation in the visible range or in the absence of light.

13. The inorganic pigment according to claim 1, wherein $TiO_2$ is $TiO_2$ rutile.

14. The inorganic pigment according to claim 1, wherein $TiO_2$ is $TiO_2$ anatase.

15. The process of claim 6, wherein $TiO_2$ is $TiO_2$ rutile.

16. The process of claim 6, wherein $TiO_2$ is $TiO_2$ anatase.

* * * * *